July 12, 1960

W. B. POLK 2,944,876

CATALYST TUBE ASSEMBLY

Filed Dec. 26, 1956

INVENTOR.
W.B. POLK

BY *Hudson and Young*

ATTORNEYS

July 12, 1960 W. B. POLK 2,944,876
CATALYST TUBE ASSEMBLY
Filed Dec. 26, 1956 2 Sheets-Sheet 2

INVENTOR.
W. B. POLK
BY Hudson and Young
ATTORNEYS

United States Patent Office 2,944,876
Patented July 12, 1960

2,944,876
CATALYST TUBE ASSEMBLY

Walter B. Polk, Borger, Tex., assignor to Phillips Petroleum Company, a corporation of Delaware Filed Dec. 26, 1956, Ser. No. 630,647

4 Claims. (Cl. 23—288)

This invention relates to an improved catalyst tube assembly. In one aspect, this invention relates to apparatus for effecting catalytic conversion of hydrocarbons. In another aspect, this invention relates to means for retaining catalyst in catalyst tubes.

In many catalytic conversion processes rapid and/or extreme temperature changes are encountered at some point in a conversion-regeneration cycle of operation. Proper control of reaction conditions may require very rapid heating or cooling of catalyst; and as this is difficult when solid catalyst material is arranged in beds it has become customary to carry out such reactions by passing reactants into contact with solid catalyst material contained in tubes, over which heating or cooling fluid may be made to flow.

It is often desirable to control the temperature of catalytic reactions within very narrow limits. Rapid and extreme temperature changes may also be necessary at some point in the cycle of operations. A catalyst case apparatus containing an assembly of tubes adapted to maintain even temperatures over a wide range and to permit rapid and extreme changes of temperature is a very desirable advance in the art. Patent 2,666,692, issued January 19, 1954, to Edward Dolezal et al., discloses and claims such a catalyst case apparatus.

Retention of the solid catalyst material in catalyst tubes has always been a problem in this type of apparatus. Ordinary screens and gratings fail when exposed to the violent fluctuations in overall temperature which occur in apparatus of this type. The catalyst retention means described in said Patent 2,666,692 gives good results and good service for a long period of time. However, it presents problems of inspection and replacement in that said inspection and replacement can be made only by cutting the catalyst tube. The difficulties involved in cutting and welding the tubes makes regular inspection of the catalyst retaining means impractical. Consequently, failure of the catalyst retaining means sometimes occurs with little or no warning.

When the catalyst retainer fails, it allows the catalyst to flow from the catalyst tube into the header and the resulting empty catalyst tube robs the adjacent tubes of their share of hydrocarbon reactants and regeneration gas. This can cause failure of a catalyst tube. When a catalyst tube failure occurs, the case containing the tube must be shut down, cooled, opened, the harp removed (unless the ruptured tube happens to be accessible), the tube re-welded, refilled with catalyst, and then replaced in the catalyst tube case. It is usually also necessary to check the adjacent tubes for catalyst content and is sometimes necessary to replace the entire harp of catalyst tubes. All of these operations require considerable time and result in the loss of much valuable production time, in addition to the actual repair cost, while the catalyst case is down for repairs. Thus, the importance and desirability of an improved catalyst retainer will be readily understood and appreciated by those skilled in the art.

An object of this invention is to provide an improved apparatus for effecting catalytic conversion of hydrocarbons. Another object of this invention is to provide an improved catalyst tube assembly for effecting catalytic reactions. Still another object of this invention is to provide an improved means for retaining catalyst in a catalyst tube. Still another object of this invention is to provide a catalyst case apparatus comprising an assembly of tubes adapted to contain solid catalyst materials. Other aspects, objects, and advantages of the invention will be apparent to those skilled in the art in view of this disclosure.

The present invention provides a new type of catalyst retainer which is easier and much less expensive to install. The catalyst retainer of the invention can be inspected and/or replaced without cutting the catalyst tubes, and in those installations wherein the catalyst retainer employed is installed within the catalyst tube itself, the improved catalyst retainer of the invention can be installed without the trouble of removing the present catalyst retainers. Broadly speaking, the catalyst retainer of my invention comprises a perforated grid member adapted to be inserted into a catalyst tube header, adjacent the catalyst tube openings in the wall of said header, and means for supporting said grid member in said header.

The invention will be described with particular reference to a catalyst case apparatus which has been found to be especially effective for the catalytic dehydrogenation of normal butane to butenes and butenes to butadiene.

Figure 3:
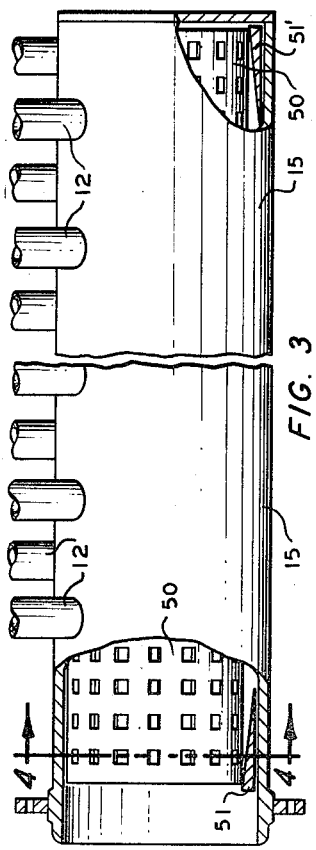
Figure 5:
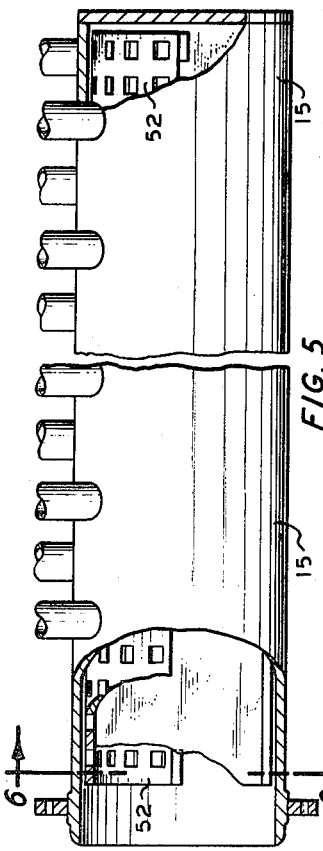
Figure 7:
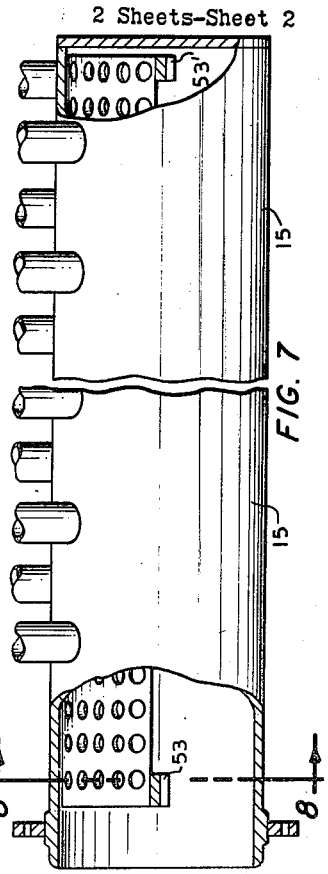

Figures 3, 5, and 7 are elevations, partially in section, showing details of different forms of the catalyst retainer of the invention.

Figure 4:
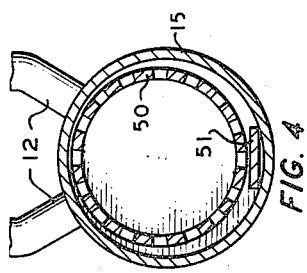
Figure 6:
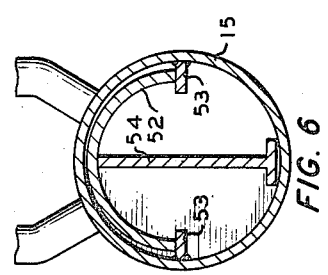
Figure 8:
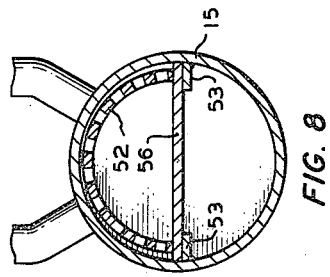

Figures 4, 6, and 8 are cross sections along the line 4—4, 6—6, and 8—8 of Figures 3, 5, and 7, respectively.

Figure 9:
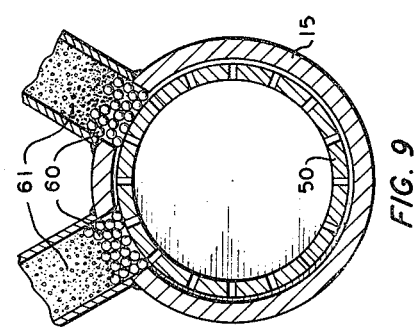

Figure 9 is a vertical section through the lower part of a catalyst tube showing a catalyst retainer of the invention installed in a cross header.

Referring now to the drawings, the invention will be more fully explained. In said drawings, like reference numerals refer to like elements in all figures.

Figure 1:
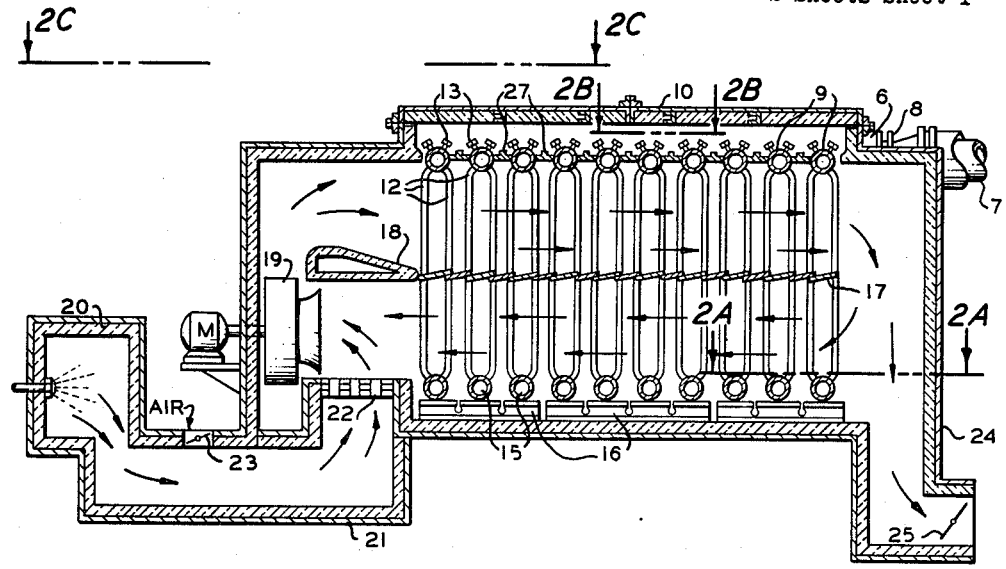
Figure 1 is a vertical section through a catalyst case of the type described and claimed in Patent 2,666,692.

In Figure 1, reference numeral 6 shows the main inlet header connected to a stationary pipe line 7 by joint 8. From main header 6, inlet cross headers 9 extend into and across insulated housing 10, having a top and sides constructed in demountable sections. Catalyst tubes 12 are connected to each of these inlet cross headers 9. Openings in inlet cross headers 9 are closed by removable plugs 13. These are disposed diametrically across the inlet header from catalyst tubes 12 and serve the purpose of admitting catalyst into the tubes. Outlet cross headers 15 extend across the insulated housing and outside the same. Outside the housing or case they connect with a main outlet header or manifold (not shown). Said outlet cross headers rest slidably upon supporting rails 16 disposed in the bottom of the insulated housing. The weight of catalyst tubes 12 is borne by these outlet cross headers 15. The catalyst tubes support the inlet cross headers and these in turn, at least partially, support the main inlet header. A flexible baffle 17 extends across the housing in a plane intersecting the tubes 12. A flow directing member 18 is attached to the end of this baffle nearest fan 19. A source of heated gases 20 is disposed outside said housing and is connected to and communicates therewith via a conduit 21 and jetting means 22.

Jetting means 22 is located upstream of the fan and downstream of catalyst tubes 12 in the continuous path of circulating gases within housing 10. A means 23 for admitting cold air in a controlled amount is disposed in said conduit. From the circulation space in the housing 10 at the end opposite the fan, a conduit 24 extends to a stack or other means of disposing of waste gases (not shown). A means 25 for controlling the amount of gas passing through such conduit is disposed in conduit 24. My copending application Serial No. 550,269, filed December 1, 1955, discloses and claims a system for controlling temperature and pressure in the system shown in Figure 1.

Figure 2:
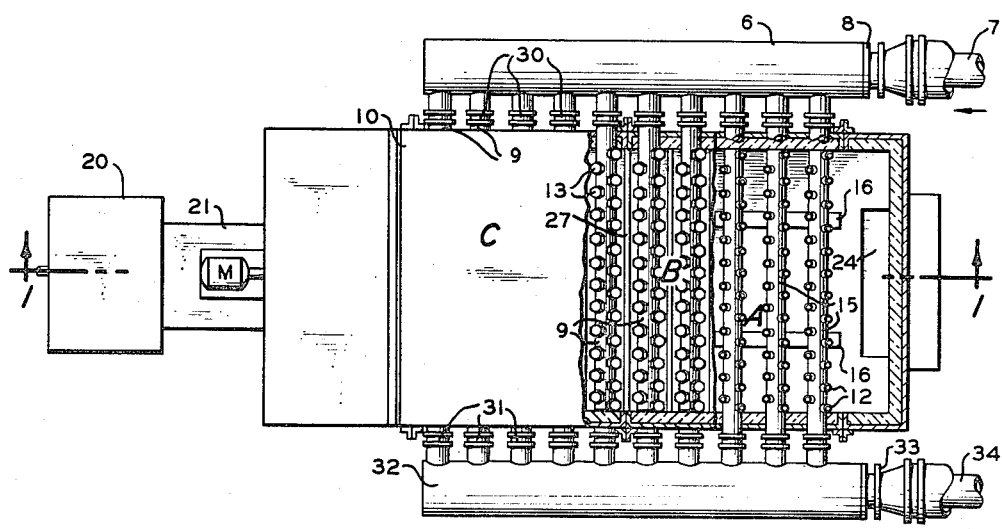
Figure 2 is a plan view of the same case; portion A showing a partial cross section at the line 2A of Figure 1, portion B showing partial cross section at the line 2B of Figure 1, and portion C showing a plan view of the top of the case.

Figure 2 shows the catalyst case assembly in plan view. In portion A catalyst tubes 12 are shown in cross section near their point of attachment to outlet cross headers 15. Said outlet cross headers each contains a detachable joint 31 adjacent to its junction with main outlet header 32. Main outlet header 32 also is provided with a detachable joint 33 at its junction with stationary pipe line 34. In portion B inlet cross headers 9 are shown extending from main inlet header 6 into and across the interior of the insulated housing 10, but not in contact with the wall of housing 10 opposite the main inlet header 6. Removable plugs 13 close openings in inlet headers 9. Spacing members 27 are disposed to fit loosely between inlet headers 9 and serve the double purpose of restraining the movement of headers 9 somewhat and preventing direct contact of hot gases with plugs 13 which would make them very difficult to remove.

In Figures 3 and 4, there is shown a portion of one of the cross headers 15 having disposed therein a cylindrical perforated grid member 50 supported and held in place by wedges 51 and 51'. Perforated grid member 50 can be a section of pipe or a piece of rolled sheet metal having an outside diameter slightly less than the inside diameter of header 15. When being installed, wedge 51' is placed in position near the closed end of header 15 and grid member 50 is pushed against it, and when said grid member is in proper position, wedge 51 is inserted between said grid member and the lower portion of the wall of header 15 at the open end of said header, as shown. It will be noted that grid member 50 is disposed in the upper portion of header 15, i.e., it is adjacent the openings in header 15 which lead to catalyst tubes 12.

In Figures 5 and 6, there is shown another embodiment of the invention wherein a semi-cylindrical perforated grid member 52 is disposed in a catalyst header 15. Said grid member 52 is supported by means of an elongated inverted T-shaped beam 54 positioned longitudinally between said grid member and the lower portion of the wall of said header. Lugs 53 positioned opposite each other, attached to, and extending inwardly from the inner wall of said header 15, at or near the open end of said header, prevent perforated grid member 52 from rotating. While lugs 53 have been shown as positioned near the open end of header 15, it will be understood that said lugs can be placed at any position, longitudinally, on header 15.

In Figures 7 and 8, there is shown a semi-cylindrical perforated grid member 52 positioned in the upper portion of a header 15, adjacent the openings into catalyst tubes 12. Said perforated grid member 52 is supported by means of an elongated shim 56 resting on a first pair of lugs 53 positioned opposite each other, attached to, and extending from the inner wall of said header 15 at the open end thereof, and a second pair of lugs 53' like said first pair of lugs, at the closed end of said header 15.

Semi-cylindrical perforated grid members 52 in Figures 5 to 8 can be a section of pipe which has been cut longitudinally or a piece of rolled sheet metal having a radius of curvature less than the radius of header 15. It will be noted that in Figures 3, 5, and 7, various designs of perforations or slots have been shown in the different perforated grid members. Any suitable form of slot, perforation, or other opening can be utilized. If desired, the perforated grid members can be covered with a wire screen. The perforated grid members, in all instances, should be sufficiently small that they can be easily removed when the wedges, T-beam, shim, or other tightening and supporting means are removed. It is not necessary, in all instances, that the perforated grid members be close fitting with respect to the inner diameter of the header 15 because, if desired, ceramic marbles 60 can be employed to support the catalyst 61 above the perforated grid member as shown in Figure 9. For example, when one-half inch diameter ceramic marbles are employed, a space of about one-fourth inch between the perforated grid member and the inner wall of header 15 can be tolerated. When ceramic marbles are employed, the perforations, slots or other openings in the grid member, should be large enough to resist plugging by catalyst fines and small enough to prevent closure by the ceramic marbles. Of course, if desired, grid members having an outer diameter only very slightly less than the inner diameter of header 15, can be employed. Usually, however, it is desirable that some space be left between the grid member and the inner wall of the header so as to facilitate installation and removal of the grid members.

While headers 15 have been shown in Figures 3, 5, and 7 as having a permanently closed end, i.e., as by a welded plate, it will be realized that if desired, said closed end can comprise a flanged end so as to further facilitate installation and removal of the perforated grid members.

It is believed that the advantages of my catalyst retainer will be apparent to those skilled in the art in view of the above disclosure. As mentioned above, my catalyst retainer is much easier to install and remove and is much less expensive than the catalyst retainers of the prior art. It will permit ready inspection each time, and change if necessary, the catalyst in catalyst tubes 12 is removed. Furthermore, this inspection and change can be effected without cutting tubes 12. The perforated grid members and the various supporting means described above can be made of any suitable material depending upon the type of service.

While the invention has been described in connection with apparatus particularly adapted for the catalytic dehydrogenation of butanes and butenes, it is to be understood that it is not so limited.

As will be evident to those skilled in the art, various other modifications of the invention can be made or employed, without departing from the scope of the invention.

I claim:

1. A catalyst retainer assembly for retaining catalyst in catalyst tubes, which comprises: an elongated, unitary, horizontally disposed cylindrical catalyst tube header having a plurality of catalyst tubes extending from openings provided in the upper portion of the wall of said header; a removable elongated perforated cylindrical grid member, having a radius of curvature less than the radius of said header, longitudinally disposed within said header adjacent said openings to prevent catalyst from flowing into said header from said tubes; and removable supporting means adapted to be inserted into the interior of and removed from said header for supporting said grid member within said header adjacent said openings, said supporting means comprising a pair of wedges disposed between said grid member and the lower portion of the wall of said header at opposite ends of said header.

2. A catalyst retainer assembly for retaining catalyst in catalyst tubes, which comprises: an elongated, unitary, horizontally disposed cylindrical catalyst tube header having a plurality of catalyst tubes extending from openings provided in the upper portion of the wall of said header; a removable elongated perforated semi-cylindrical grid member, having a radius of curvature less than the radius of said header, longitudinally disposed within said header adjacent said openings to prevent catalyst from flowing into said header from said tubes; and removable supporting means adapted to be inserted into the interior of and removed from said header for supporting said grid member within said header adjacent said openings, said supporting means comprising: a pair of lugs, positioned opposite each other, attached to, and extending inwardly from the inner wall of said header below said grid member; and a removable elongated, inverted, T-shaped beam positioned longitudinally between said grid member and the lower portion of the wall of said header.

3. A catalyst retainer assembly for retaining catalyst in catalyst tubes, which comprises: an elongated, unitary, horizontally disposed cylindrical catalyst tube header having a plurality of catalyst tubes extending from openings provided in the upper portion of the wall of said header, a removable elongated perforated semi-cylindrical grid member, having a radius of curvature less than the radius of said header, longitudinally disposed within said header adjacent said openings to prevent catalyst from flowing into said header from said tubes; and removable supporting means adapted to be inserted into the interior of and removed from said header for supporting said grid member within said header adjacent said openings, said supporting means comprising: a first pair of lugs, positioned opposite each other, attached to, and extending inwardly from the inner wall of said header at one end of said header below said grid member; a second pair of lugs, like said first pair of lugs, at the other end of said header; and a removable elongated shim resting on said pairs of lugs.

4. A catalyst retainer assembly for retaining catalyst in catalyst tubes, which comprises: an elongated, unitary, horizontally disposed cylindrical catalyst tube header having a plurality of catalyst tubes extending from openings provided in the upper portion of the wall of said header; a removable elongated cylindrical grid member having a diameter slightly less than the diameter of the inner wall of said header and self supporting within said header, and longitudinally disposed within said header adjacent said openings to prevent catalyst from flowing into the interior of said header from said tubes and adapted to be inserted into and removed from said header; said grid member being perforated throughout to allow gas flow from said tubes through said grid member.

References Cited in the file of this patent
UNITED STATES PATENTS

| | | |
|---|---|---|
| 1,900,857 | Berry | Mar. 7, 1933 |
| 2,142,678 | Porter | Jan. 3, 1939 |
| 2,666,692 | Dolezal | June 19, 1954 |
| 2,747,975 | Thompson | May 29, 1956 |